United States Patent
Anand et al.

(10) Patent No.: US 7,867,535 B2
(45) Date of Patent: Jan. 11, 2011

(54) PROCESS FOR PRODUCING BAKED POTATO SLICES WITH EXPANDED TEXTURE

(75) Inventors: Ashish Anand, Plano, TX (US); Robin S. Hargrove, Reading (GB); V. N. Mohan Rao, Plano, TX (US)

(73) Assignee: Frito-Lay North America, Inc., Plano, TX (US)

(*) Notice: Subject to any disclaimer, the term of this patent is extended or adjusted under 35 U.S.C. 154(b) by 409 days.

(21) Appl. No.: 12/116,620

(22) Filed: May 7, 2008

(65) Prior Publication Data

US 2009/0280224 A1    Nov. 12, 2009

(51) Int. Cl.
*A23P 1/14* (2006.01)
(52) U.S. Cl. .................. 426/242; 426/637; 426/447; 426/468; 426/512; 426/523
(58) Field of Classification Search ......... 426/241–243, 426/637, 445, 447, 465, 466, 468, 512, 520, 426/523
See application file for complete search history.

(56) References Cited

U.S. PATENT DOCUMENTS

| | | | | |
|---|---|---|---|---|
| 2,431,530 A * | 11/1947 | Wiley | ........................... | 425/408 |
| 3,864,505 A * | 2/1975 | Hunter et al. | ................ | 426/560 |
| 4,931,303 A * | 6/1990 | Holm et al. | .................. | 426/549 |
| 5,188,859 A * | 2/1993 | Lodge et al. | ................. | 426/560 |
| 6,569,481 B1 | 5/2003 | Malfait | | |
| 7,141,257 B2 | 11/2006 | Malfait | | |
| 7,332,189 B2 * | 2/2008 | Mihalos et al. | .............. | 426/497 |
| 2005/0150392 A1 | 7/2005 | Van Poucke | | |
| 2005/0196495 A1* | 9/2005 | Sakaguchi | ................... | 426/241 |
| 2009/0061063 A1* | 3/2009 | Takeo et al. | .................. | 426/560 |

* cited by examiner

*Primary Examiner*—Drew E Becker
(74) *Attorney, Agent, or Firm*—Colin P. Cahoon; James R. Gourley; Carstens & Cahoon, LLP

(57) ABSTRACT

A method is disclosed for producing a baked snack chip made from a raw potato slice. The snack chip has a light, crispy, expanded texture similar to the texture of a fried potato chip. It is formed by compressing and heating a partially dried potato slice and then expanding the potato slice. Alternatively, the expanded potato slice is compressed again.

12 Claims, 1 Drawing Sheet

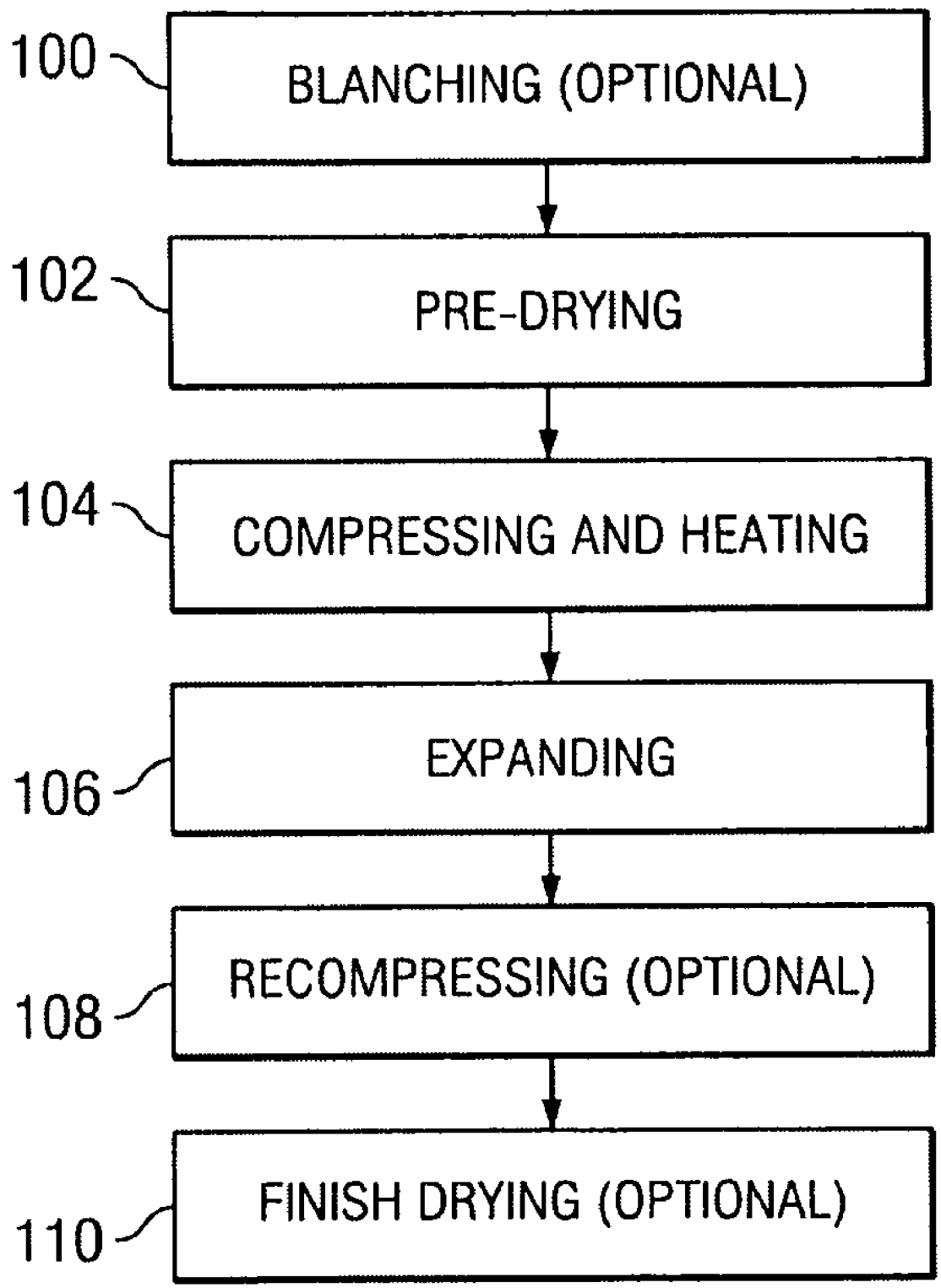

PROCESS FOR PRODUCING BAKED POTATO SLICES WITH EXPANDED TEXTURE

BACKGROUND OF THE INVENTION

1. Technical Field

The present invention relates to a process for producing baked potato slices with expanded texture similar to fried potato chips.

2. Description of Related Art

Snack foods such as potato chips are popular consumer items for which there exists a great demand. Potato chips are prepared by cooking slices of whole potatoes. One prior art method of cooking the potato slices involves immersing, the raw potato slices in a hot oil bath, which is otherwise known as "frying" the potato slices. Fried potato slices are referred to herein as "fried potato chips."

Fried potato chips have a light, crispy and expanded texture that is desired by consumers. This desirable texture is imparted into the fried potato chips because placing the raw potato slices into the hot oil bath causes moisture to quickly escape from the interior of the potato slice, thereby expanding the texture of the potato starch. This light, crispy, expanded texture is one of the main reasons fried potato chips are such a popular consumer item, In recent years, consumer demand has been dramatically increasing for healthy foods in general, and healthy snack foods in particular. In many consumers' minds, fried potato chips do not qualify as a healthy snack food because oil is absorbed by the chip during the frying process. Consequently, the nutrition label affixed to bags of fried potato chips will typically indicate a fat content per serving that is above what some consumers find acceptable.

One healthy alternative to fried potato chips is baked potato chips. Baked potato chips in the prior art are generally made by baking raw potato slices in a hot air oven, or a combination of microwave; infra-red and hot air oven. These baked potato chips do contain less oil than fried potato chips, but their texture lacks some of the light, crispy, expanded qualities of fried potato chips.

No prior art process has been successful in creating a potato chip that has not been fried, but that still has the desirable light, crispy, expanded texture of a fried potato chip.

SUMMARY OF THE INVENTION

The invention comprises a process for producing baked potato chips with a light, crispy and expanded texture of fried potato chips. In one embodiment, whole slices of potato are partially dried in a hot air oven and/or microwave oven. The partially dried potato slices are then placed into a pressure popper and heated under high pressure. The pressure is then released and the potato slices rapidly dehydrate and expand. The dehydrated, expanded potato slices can then optionally be dried further and seasoned to taste. This process provides baked potato chips that have a light, crispy, expanded texture similar to the texture of fried potato chips. In another embodiment, the expanded potato slice is recompressed in the pressure popper soon after it is expanded to produce a snack chip that is thinner and crunchier.

The above as well as additional features and advantages of the present invention will become apparent in the following written detailed description.

BRIEF DESCRIPTION OF THE DRAWINGS

The hovel features believed characteristic of the invention are set forth in the appended, claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flow, chart showing one embodiment of the process for making a baked expanded potato snack chip.

DETAILED DESCRIPTION

The present invention is a process that generates baked potato snack chips that have a light, crispy and expanded texture, which is similar to the texture of a fried potato snack chip. Additionally, the nutritional goals for the snack chips of the present invention include, per 1 ounce serving of snack chips: no more than 5 g of fat, 1 gram or less of saturated fat, zero trans-fatty acids, less than 25% calories from added sugar, and no more than 240 milligrams of sodium.

To make the baked expanded potato chips of the present invention, a pressure popper is used. Examples of pressure poppers can be found in U.S. Pat. No. 6,569,481 and U.S. Patent Application No. US2005/0150392A1. The pressure popper used in the present invention comprises a top plate, a bottom plate and a mold. The mold preferably has an interior perimeter that may be circular in cross section, but can be any desired shape. The top plate and bottom plate have a perimeter that is similar in size and shape to the interior perimeter of the mold. The bottom plate of the pressure popper initially forms a cavity inside the mold.

Pressure poppers have been used in the art to create expanded cakes from cereal grain. One or a combination of, for example, corn and rice are initially placed into the mold. Next, the top and bottom plates cook the cereal grains under pressure and temperature until the grain mixture reaches a flowable state. Finally, the top and bottom plates release the pressure, causing the cooked grain mixture to rapidly expand and dehydrate. When a mold having a circular cross section is used, the resulting cereal grain cake looks like a hockey puck. Thus, these prior art cakes lack the desirable natural shape of a potato chip. Furthermore, these cakes do not have the light crispy texture of fried potato chips, and instead tend to have what some consumers consider to be a texture closer to expanded polystyrene foam. It was unexpected, therefore, that cooking and expanding whole potato slices in a pressure popper would produce the desired fried potato chip texture. Potato slices also provide a versatile medium that allows practitioners to create a wide-variety of snack chip flavors because the underlying potato flavor is neutral and can be seasoned many different ways. By contrast, corn has a distinctive flavor profile that limits the number of ways a corn-based snack chip can be seasoned, while rice lacks much flavor of any kind. No prior art method uses a pressure popper to create baked expanded potato chips from potato slices.

Referring to FIG. 1, therein is depicted a flowchart for the method of the present invention. In one embodiment, the potato slices are blanched 100, preferably in water at about 90° C. for about 60 seconds, before they are pre-dried. Next, raw potato slices are partially pre-dried 102 before they are placed in the pressure popper. Partially drying the potato slices before putting them into the pressure popper reduces the dwell time, of the slices inside the popper, thereby improving the resulting texture arid flavor of the potato chips. The partially dried potato slices comprise a moisture content between about 11% and, about 14% by weight in one embodiment, and a moisture content of about 12% in a preferred embodiment. Raw potato slices generally comprise between about 75% and about 85% water. Thus, raw potato slices must be dried to between about 11% and about 14% moisture by weight to produce the partially dried potato slices that are placed into the pressure popper. The drying process used can be any method known in the art, but in a preferred embodiment comprises baking in a hot air convection oven, and in another preferred embodiment comprises cooking in a microwave oven and/or RF heating. The potato slices should not be heated so much that the potato starch begins to gelatinize. The goal of the present invention is to dehydrate the potato slices without gelatinizing the potato starch. After the raw potato slices have been partially dehydrated, they are placed in the pressure popper.

Once a partially dried potato slice is inside the cavity created by the bottom plate and the mold, the pressure popper forces the top plate and bottom plate towards each other until the potato slice is compressed into a pressed potato slice. The pressure exerted on the potato slice ranges between about 100 pounds per square inch (psi) and about 2200 psi. In one embodiment, the time interval between the instant the top plate first contacts the potato slice and the instant the top plate stops moving towards the bottom plate is between about 1 second and about 4 seconds. In another embodiment, the rate of travel for the top plate is between about 0.01 meters per second and about 0.4 meters per second, and the rate of travel for the bottom plate is between about 0.001 meters per second and about 0.4 meters per second.

The top plate and bottom plate are also heated during compression, which heats the potato slice. In one embodiment, the temperature of the top plate is between about 190° C. and about 230° C., and the temperature of the bottom plate is between about 200° C. and about 240° C. In yet another embodiment, the pressed potato slice is preferably heated for a dwell time between about 1 second and about 4 seconds after the top plate and bottom plate have stopped moving towards the pressed potato slice. Thus, in one embodiment, the total time for the compression and heating step 104 is between about 2 seconds and about 8 seconds.

Once the potato slice has been compressed and heated, the pressure popper rapidly moves the top plate and bottom plate away from the pressed potato slice, which quickly reduces the pressure on the pressed potato slice, causes moisture to escape from it as steam, and therefore causes expansion 106 of the starch in the potato slice. In one embodiment, the rate of travel for the top plate is between about 0.01 meters per second and about 0.4 meters per second, and the rate of travel for the bottom plate is about 0.001 meters per second and about 0.4 meters per second. The escaping steam expands and dehydrates the pressed potato slice, producing an expanded and dehydrated potato slice. In one embodiment, this expanded, dehydrated potato slice comprises the snack chip of the present invention.

In another embodiment, the expanded potato slice can be recompressed 108 between the plates to create a thinner, crunchier snack chip. Thus* in one embodiment, while the expanded potato is still hot and in a plastic state, the pressure, popper moves the top plate and bottom plate towards expanded potato slice, causing the expanded potato slice to be recompressed. In a preferred embodiment, the expanded chip is recompressed to a thickness between about 1.5 millimeters and about 3 millimeters. Preferably, the top and bottom plates remain heated during the recompression step. The recompressed potato slice comprises another embodiment of the snack chip of the present invention. The top plate and bottom plate slowly move away from each other and the snack chip is ejected from the pressure popper once it has cooled to a temperature such that it is sufficiently solid to maintain its structure outside the mold.

In one embodiment, the moisture content of the snack chip after it is ejected from the pressure popper is between about 4% and about 6%. If necessary, the snack chips can optionally be finish dried 110 to a final moisture content between about 1% and about 2% by weight. This Final drying step can occur in a vacuum or hot air oven, or any other method known in the art. The snack chip can also optionally be seasoned to taste.

EXAMPLE 1

Baked Expanded Potato Chip

Raw potato slices between about 0.5 millimeters and about 3 millimeters thick were blanched in boiling water for between about 30 seconds and about 4 minutes. The potato slices were then pre-dried in an air stream and introduced into a microwave oven. The microwave oven contained superheated steam at a temperature between about 100° C. and about 160° C., which helped encourage even heating and prevent dehydration at higher temperatures (although the temperature of the potato slices was kept below 110° C.). The potato slices were heated in the microwave/steam oven for between about 30 seconds and about 10 minutes, until their moisture content was between about 11% and about 14% by weight.

Each slice was then heated and compressed in apressure popper. In the pressure popper, the bottom plate initially formed a cavity inside the mold. Each potato slice was then fed into the cavity and the top plate and bottom plate compressed and heated the potato slice between, them. The temperature of the top plate was about 210° C. and the temperature of the bottom plate was about 220° C. The pressure between the top and bottom plate was about 1400 psi. The potato slice between the stationary plates was cooked under pressure for a dwell tune of about 2.5 seconds to produce a pressed potato slice. The top plate and bottom plate then moved away from the pressed cake at about 0.4 meters per second for about 40 milliseconds to produce an expanded potato slice. The expanded potato slices were then finish dried in a hot air oven at an oven temperature between about 100° C. and 200° C. until the moisture content of the snack chips was between about 1% and about 2% by weight.

The finish dried snack chips had a light, crispy expanded texture similar to that of a fried potato chip. In addition, the baked, expanded potato chips disclosed herein met or exceeded the other preferred nutritional goals. Specifically, the snack chips disclosed above included, per 1 ounce serving of snack chips, no more than 5 g of fat, 1 gram or less of saturated fat, zero trans-fatty acids, less than 25% calories from added sugar, and no more than 240 milligrams of sodium.

While the invention has been particularly shown and described with reference to a preferred embodiment, it will be understood by those skilled in the art that various changes in form and detail may be made therein without departing from the spirit and scope of the invention.

What is claimed is:

1. A method for making a snack chip, said method comprising:
   providing a raw potato slice;
   pre-drying said raw potato slice to an intermediate moisture content between about 11% and about 14% by weight to produce a partially dried potato slice
   compressing and heating said partially dried potato slice between a top plate and a bottom plate inside a mold to produce a pressed potato slice; and expanding said pressed potato slice to produce an expanded snack chip with a moisture content less than about 6% by weight.

2. The method of claim 1 further comprising finish drying said expanded snack chip to a final moisture content between about 1% and about 2% by weight.

3. The method of claim 1 further comprising recompressing said expanded snack chip to produce a compressed snack chip.

4. The method of claim 1 wherein said expanded snack chip has a moisture content between about 4% and about 6% by weight.

5. The method of claim 1 wherein said compressing and heating further comprises heating said top plate to a temperature between about 190° C. and about 230° C.

6. The method of claim 1 wherein said compressing and heating further comprises heating said bottom plate to a temperature between about 200° C. and about 240° C.

7. The method of claim 1 wherein said pre-drying comprises drying said raw potato slice inside a microwave oven containing superheated steam at a steam temperature between about 100° C. and about 160° C. for a dwell time between about 30 seconds and about 10 minutes.

8. The method of claim 1 wherein said pre-drying comprises drying said raw potato slice using at least one of RF heating, convection heating, or microwave heating.

9. The method of claim 1 wherein said compressing and heating occurs at a pressure between about 100 pounds per square inch and about 2200 pounds per square inch.

10. The method of claim 1 wherein said compressing and heating occurs during a time interval between about 2 seconds and about 8 seconds.

11. The method of claim 3 wherein said recompressing occurs during a time interval between about 1 second and about 4 seconds.

12. The method of claim 3 wherein said recompressing occurs at a pressure between about 100 pounds per square inch and about 2200 pounds per square inch.

* * * * *